(12) United States Patent
Simper et al.

(10) Patent No.: US 9,160,174 B2
(45) Date of Patent: Oct. 13, 2015

(54) CONTROL ARCHITECTURE FOR POWER SWITCHING CONTROLLER

(75) Inventors: Norbert J. Simper, Bissingen (DE); Markus Greither, Augsburg (DE)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 707 days.

(21) Appl. No.: 13/491,886

(22) Filed: Jun. 8, 2012

(65) Prior Publication Data
US 2013/0140892 A1    Jun. 6, 2013

Related U.S. Application Data

(60) Provisional application No. 61/566,283, filed on Dec. 2, 2011.

(51) Int. Cl.
| | |
|---|---|
| *H02J 3/14* | (2006.01) |
| *H02J 4/00* | (2006.01) |
| *H02M 3/335* | (2006.01) |
| *H02J 1/10* | (2006.01) |
| *H02J 3/00* | (2006.01) |
| *H02J 3/46* | (2006.01) |

(52) U.S. Cl.
CPC . *H02J 4/00* (2013.01); *H02J 1/102* (2013.01); *H02J 3/005* (2013.01); *H02J 3/006* (2013.01); *H02J 3/46* (2013.01); *H02M 3/33523* (2013.01); *H02J 3/14* (2013.01); *Y10T 307/406* (2015.04)

(58) Field of Classification Search
CPC ............ H02J 4/00; H02J 1/102; H02J 3/005; H02J 3/006; H02J 3/46; H02J 3/14; H02M 3/33523; Y10T 307/406
USPC ............................................................ 307/31
See application file for complete search history.

(56) References Cited

U.S. PATENT DOCUMENTS

| | | | |
|---|---|---|---|
| 6,470,224 B1 | 10/2002 | Drake et al. | |
| 6,768,350 B1 | 7/2004 | Dickey | |
| 6,856,045 B1 | 2/2005 | Beneditz et al. | |
| 7,064,448 B2 | 6/2006 | Maier | |
| 7,505,820 B2 | 3/2009 | Plivcic et al. | |
| 7,646,108 B2 * | 1/2010 | Paillet et al. ................... | 307/11 |
| 7,747,879 B2 | 6/2010 | Tofigh et al. | |
| 7,948,391 B2 * | 5/2011 | Pullmann et al. ............. | 340/679 |
| 8,030,908 B2 * | 10/2011 | Huang ........................... | 323/237 |
| 8,031,451 B2 | 10/2011 | Beneditz et al. | |
| 8,089,303 B2 | 1/2012 | Girot et al. | |
| 8,148,848 B2 | 4/2012 | Rusan et al. | |

* cited by examiner

*Primary Examiner* — Hal Kaplan
(74) *Attorney, Agent, or Firm* — Carlson, Gaskey & Olds, P.C.

(57) ABSTRACT

A control architecture for a power controller has a power line input, a plurality of power channels that are operable to control power flow from the power line input to one or more loads, an isolated power supply, and a microcontroller module that controls each of the multiple power channels.

16 Claims, 2 Drawing Sheets

CONTROL ARCHITECTURE FOR POWER SWITCHING CONTROLLER

REFERENCE TO RELATED APPLICATIONS

This application claims priority to U.S. Provisional Patent Application No. 61/566,283, filed Dec. 2, 2011.

BACKGROUND

The present disclosure relates generally to power switching controllers and, more specifically, to a control architecture for a power switching controller.

In power distribution systems there are multiple power outputs that are powered from a single power source and protected from short circuit fault propagation using power controller circuits, such as solid-state power controllers (SSPC's). In such an arrangement, each of the multiple power outputs are individually switched, and the power switching controller circuit for a given power output is referred to as a power channel.

In conventional power distribution systems, each power channel includes a dedicated isolated power supply, microcontroller, and isolated data bus. When multiphase AC switching is implemented in conventional control architectures, a semiconductor output switch for each channel is referenced to the switched voltage of the channel. Consequently, each power control channel is referenced to the switched voltage of the power control channel. As each individual channel of a multiphase switch is referenced to different input phases, at any given point in time the power channels do not have the same ground potential. Due to the varying reference voltages, cross-communicating between the channels requires isolation of the channels. Inter channel cross-communication is required to synchronize tripping in the case that one channel detects a short circuit fault, and can be used to implement additional synchronization features.

SUMMARY

A control architecture for a power controller according to an exemplary aspect of the present disclosure includes, among other things, a power line input, a plurality of power channels operable to control power flow from the power line input to at least one load. An isolated power supply is connected to the power line input such that the power line input provides a reference voltage for the isolated power supply and the microcontroller module is operable to control the plurality of power channels.

A method for controlling a power switching controller includes the step of providing a shared reference voltage to each of multiple power channels and an isolated power supply, thereby allowing a single microcontroller module to control each of the multiple power channels.

These and other features of the invention would be better understood from the following specifications and drawings, the following of which is a brief description.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
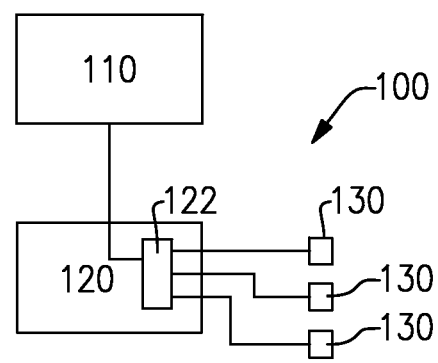
FIG. 1 illustrates a highly schematic power distribution system.

FIG. 1 illustrates a highly schematic power distribution system 100. Electrical power is generated in a power generator 110, or provided from an alternate power source. The power is passed to a power switching module 120. The power switching module 120 uses a power switching controller 122 to distribute power to each of multiple loads 130.

Figure 2:
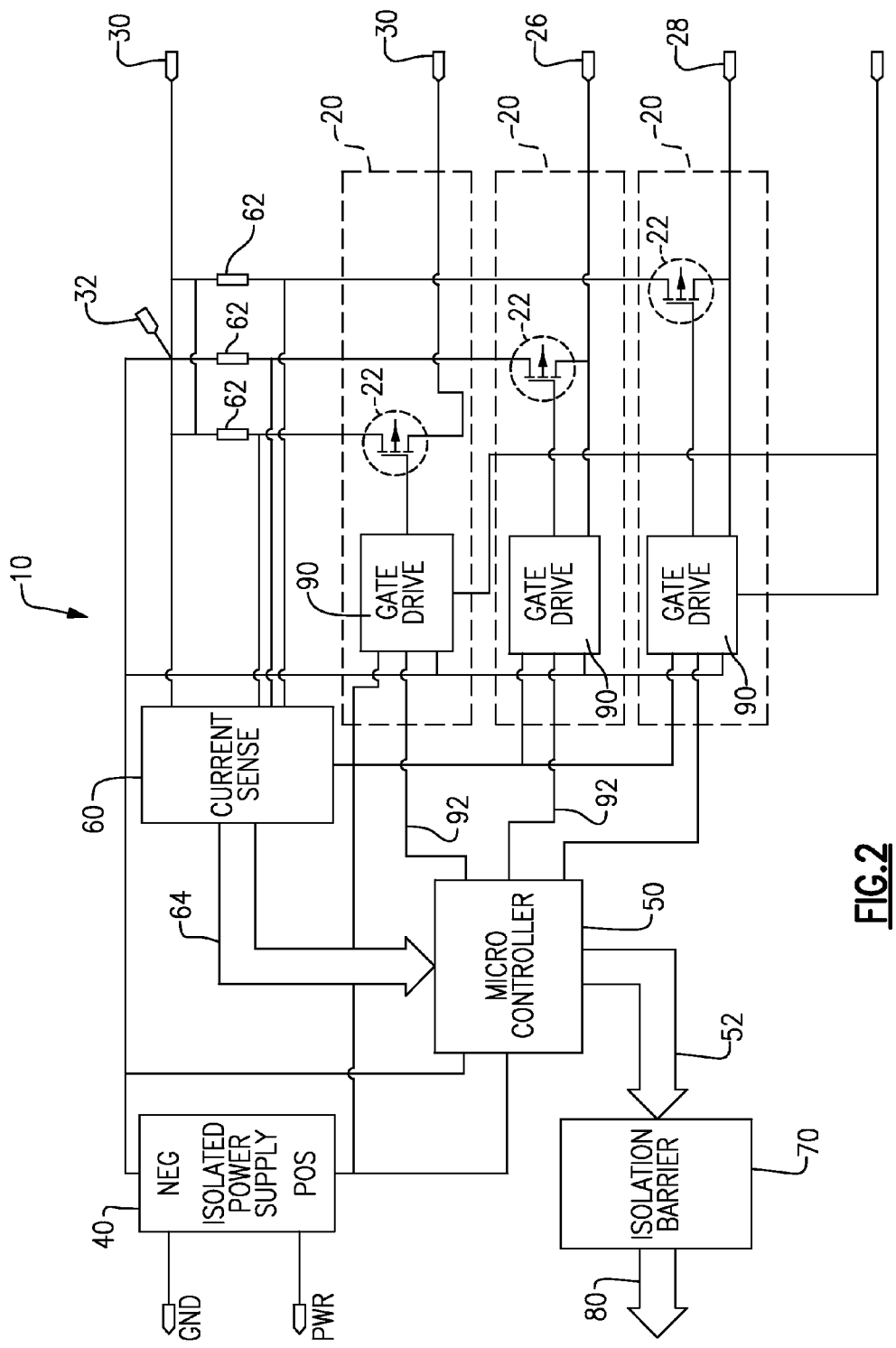
FIG. 2 illustrates a control architecture for a power switching controller.

FIG. 2 illustrates a power switching control architecture 10 including multiple power channels 20. The multiple power channels 20 can be solid-state power channels, in which case the power control architecture is referred to as a solid-state power controller (SSPC). Each of the power channels 20 receives line power from a power line input 30 and uses a transistor 22 to control power distribution from the power line input 30 to a corresponding load 24, 26, 28. Likewise, a transistor network of multiple transistors can be used in place of the illustrated single transistor 22 without negatively impacting performance. Each power channel 20 also includes a gate drive 90 that controls the open/closed state of the corresponding transistor 22. In an alternate example, each of the power channels 20 provides one phase to a multiphase load, rather than to three separate loads 24, 26, 28.

The gate drives 90 each include a control input 92 originating from a single microcontroller module 50. The control input 92 controls the gate drive 90, allowing the microcontroller module 50 to control the switching of the transistor 22 in each power channel 20. Each of the gate drives 90 also includes a reference input 32 (alternately referred to as a neutral point). The reference input 32 for each gate drive 90 is tied to the power line input 30, and thus each of the power channels 20 shares a common reference voltage.

The current sensor module 60 is configured with sense resistors 62 on the power line input 30 connection to each of the transistors 22, thereby allowing the current sensor module 60 to detect an electric current passing through each of the transistors 22 in the power channels 20. The current sensor module 60 also includes a data connection 64 to the microcontroller module 50, thereby allowing the detected current information to be passed to the microcontroller module 50.

Also included in the power switching control architecture 10 is an isolated power supply 40 that provides operational power to the microcontroller module 50. As with each of the power channels 20, the isolated power supply 40 is referenced to the power line input 30 at reference point 32. Thus, the control elements of the switching control architecture 10 that are powered by the isolated power supply 40 have the same reference voltage as power channels 20. Sharing a reference voltage ensures that the microcontroller module 50 can communicate with each of the power channels 20 without risking damage to either the power channels 20 or the microcontroller module 50.

To enable cross-controller communication with other power switching control architectures 10 or with a systems level controller (not pictured), the microcontroller module 50 includes a data output 52 to an isolation barrier 70. The isolation barrier 70 isolates data 80 being passed to a data bus (not pictured) or to the systems level controller, thereby preventing the floating voltage of the reference point 32 of the switching control architecture 10 from affecting the data bus or the systems level controller.

In the illustrated example, the components in each of the power channels 20 are identical. That is to say, the gate drives 90, the transistors 22, and the corresponding switching circuitry is identical between each of the power channels 20. It is further understood that multiple channels 20 beyond the illustrated three power channels can be implemented by one or ordinary skill in the art in light of the present disclosure. Likewise, a transistor network of multiple transistors could be used in place of the illustrated single transistor 22 without negatively impacting performance.

The microcontroller module 50 is a single microcontroller configured to control each of the power channels 20 in one example arrangement. In another example arrangement, the microcontroller module 50 includes a primary microcontroller and a redundant microcontroller. The alternate example microcontroller module 50 allows for the control architecture 10 to continue functioning in the case of a failure in the primary microcontroller, by switching control to the redundant microcontroller.

Due to the common reference point 32 between all of the power channels 20 and the microcontroller module 50, all the power channels 20 can be controlled by a single microcontroller module 50 without requiring potentially bulky and expensive electrical isolators at each control connection. Utilization of the single microcontroller module 50 instead of separate microcontroller modules 50 for each power channel 20 further allows the weight and cost of the switching control architecture 10 to be reduced by eliminating redundant microcontroller modules 50, current sensors 60, isolated power supplies 40, and isolator 70. Elimination of the control components rendered unnecessary due to the single microcontroller module 50 also provides for a reduced complexity and a corresponding reduced overall failure risk of the switching control architecture 10.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A control architecture for a power switching controller comprising:
    a power line input;
    a plurality of power channels operable to control power flow from said power line input to at least one load, wherein each of said power channels has a shared reference voltage;
    an isolated power supply, distinct from said power line input, wherein said isolated power supply is connected to said power line input such that said isolated power supply shares said reference voltage with said plurality of power channels; and
    a microcontroller module operable to control said plurality of power channels.

2. The control architecture of claim 1, wherein said microcontroller module comprises a single microcontroller.

3. The control architecture of claim 1, wherein said microcontroller module comprises a first primary microcontroller and a second redundant microcontroller.

4. The control architecture of claim 1, wherein each of power channels comprises at least one gate driver and at least one transistor.

5. The control architecture of claim 4, further comprising a current sense module operable to detect a current in each of said power channels.

6. The control architecture of claim 5, wherein said detected current is a current passing through said at least one transistor.

7. The control architecture of claim 5, wherein said current sense module is coupled to said microcontroller module such that said detected current is communicated to said microcontroller module.

8. The control architecture of claim 1, wherein each of said plurality of power channels is a configurable solid state power channel having a variable current rating.

9. The control architecture of claim 1, wherein said isolated power supply comprises a single isolated power supply operable to provide operational power to said microcontroller module and said plurality of power channels.

10. The control architecture of claim 1, wherein each of said power channels is a solid state power channel.

11. The control architecture of claim 1, wherein said shared reference voltage is a reference voltage of said power line input.

12. The control architecture of claim 1, wherein said at least one load is a multiphase load and wherein each of said plurality of power channels provides one phase to said multiphase load.

13. The control architecture of claim 1, wherein said microcontroller module is connected to at least one of another power switching control architecture and a systems level controller through an isolation barrier.

14. The control architecture of claim 13, wherein the isolation barrier is configured to isolate data passed from said microcontroller module such that said reference voltage is prevented form affecting the at least one of another power switching control architecture and the systems level controller.

15. A method for supporting a power switching controller comprising the step of:
    interfacing the power switching controller to multiple current sensors and to an isolated control power supply using a shared reference voltage for multiple power channels, thereby allowing a single microcontroller module to control each of said multiple power channels; wherein the isolated control power supply is distinct from a power line input passed through at least one of said multiple power channels.

16. The method of claim 15, further comprising switching control of said multiple power channels from a primary microprocessor in said microcontroller module to a redundant microprocessor in said microcontroller module when a failure state is detected.

* * * * *

UNITED STATES PATENT AND TRADEMARK OFFICE
CERTIFICATE OF CORRECTION

PATENT NO. : 9,160,174 B2
APPLICATION NO. : 13/491886
DATED : October 13, 2015
INVENTOR(S) : Norbert J. Simper It is certified that error appears in the above-identified patent and that said Letters Patent is hereby corrected as shown below:

IN THE CLAIMS:

In claim 4, column 4, line 1; "each of" should read as --each of said--

In claim 14, column 4, line 39; delete "form" and insert --from--

Signed and Sealed this
Sixteenth Day of August, 2016

Michelle K. Lee
*Director of the United States Patent and Trademark Office*